Oct. 14, 1958     T. H. SCHULTZ     2,856,291

PREPARATION OF SOLID FLAVORING COMPOSITIONS

Filed March 18, 1957

INVENTOR.
THOMAS H. SCHULTZ
BY

R. Hoffman     ATTORNEY

United States Patent Office 2,856,291
Patented Oct. 14, 1958

2,856,291

PREPARATION OF SOLID FLAVORING COMPOSITIONS

Thomas H. Schultz, Lafayette, Calif., assignor to United States of America as represented by the Secretary of Agriculture Application March 18, 1957, Serial No. 646,943

5 Claims. (Cl. 99—140)

(Granted under Title 35, U. S. Code (1952), sec. 266)

A non-exclusive, irrevocable, royalty-free license in the invention herein described, throughout the world for all purposes of the United States Government, with the power to grant sub-licenses for such purposes, is hereby granted to the Government of the United States of America.

This invention relates to and has among its objects the provision of novel flavoring compositions and methods for producing them. A general object of the invention concerns the preparation of solid flavoring compositions which serve as convenient sources of flavor and in which the active flavoring principles are effectively "locked-in," that is, the flavoring principles are completely surrounded by an edible, solid impermeable protective substance whereby the composition may be stored for long periods of time without loss of flavoring value through vaporization or deterioration of the flavoring principles. A specific object of the invention concerns the preparation of flavoring compositions having the above-mentioned properties and possessing a particular dimensional form, namely, in the form of rod-shaped particles. The objects of the invention thus include the provision of the compositions in such rod form and the method for producing the compositions of such form. Further objects and advantages of the invention will be evident from the description herein taken in connection with the annexed drawing.

Figures 1, 2:
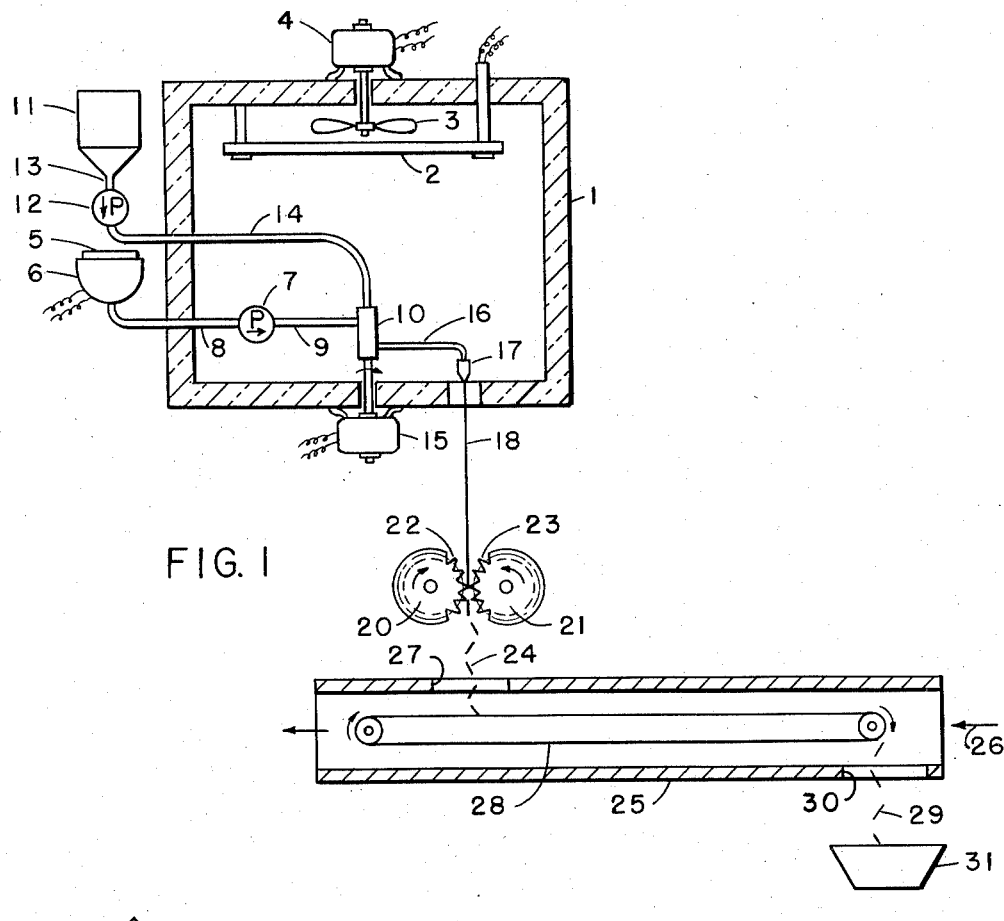
Fig. 1 is an elevation, parting in cross-section, of an apparatus for producing the novel compositions of this invention.
Fig. 2 is an elevation on a greatly enlarged scale of a rod-shaped particle of stabilized flavoring composition produced in accordance with this invention.

It has been proposed heretofore to prepare flavoring compositions by emulsifying the flavoring agent with a molten edible base, cooling the resulting composition to solidify it, then grinding the solidified mass into small particles suitable for incorporation with solid food products such as dehydrated orange juice. The disadvantages of this prior method are explained as follows. When the mass is disintegrated, each resulting particle will contain a portion of its flavoring agent content at the surface of the particles. This is an inevitable result of the crushing or grinding operation since every division of the mass having therein a uniform dispersion of flavoring agent will result in particles having some flavoring agent on their surfaces. This surface portion of the flavoring agent is naturally subject to loss by vaporization and deterioration by chemical agencies as it is not locked-in the matrix of the carrier mass but merely on the surface. To remedy this situation, it is advisable in the known process to remove the surface fraction of the flavoring agent by subjecting the crushed product to a vacuum for a substantial period of time. This vacuum treatment results in removal of the surface fraction of the flavoring agent without removal of the portion of the flavoring agent which is actually dispersed within the edible base. The vacuum-treated product is then useful as a convenient source of flavor and the flavoring agent in it is locked-in and protected from vaporization and deterioration.

In accordance with the present invention solid flavoring compositions can be produced by a procedure which obviates the disadvantages of the known technique. Briefly described, the procedure of this invention involves the following steps:

Initially there is prepared a hot liquid emulsion of the volatile liquid flavoring agent in an edible carrier base. By way of example, orange oil is mixed with a molten base containing mostly sucrose together with a minor amount of corn syrup solids and water thus to produce an emulsion of the orange oil in the hot, liquefied sugar base.

The hot liquid emulsion is then extruded through an orifice into the atmosphere in the form of a continuous stream of narrow cross-section.

The stream is permitted to cool enough to attain a plastic condition and is then subjected to cutting or pinching action to divide it into rod-like elements. These elements are cooled and collected; and they constitute the product—the solid flavoring composition in which the flavoring agent is locked-in against vaporization and deterioration.

The rod-like particles of stabilized flavoring composition possess many advantages. For one thing, they contain the flavoring agent in locked-in condition so that the particles may be held indefinitely in storage with no substantial loss or deterioration of flavoring agent. A further advantage is that when the particles are contacted with water as in utilizing them for ultimate consumption, the flavoring agent is released as minute globules throughout the liquid preparation. Thus, for instance, when dehydrated orange juice fortified with the product of this invention is reconstituted by addition of water, the flavoring agent (orange oil) is released as minute globules, a substantial portion of which will dissolve in the reconstituted juice and the remainder of which will exist as minute globules suspended in and dispersed throughout the volume of the juice. Thus the resulting reconstituted juice has a natural appearance and a uniform flavor. Such a result is to be contrasted to a situation wherein on reconstitution the oil would be released in a single body or in large particles in which case the oil would float to the top of the juice, giving it an unnatural oily surface and an extreme concentration of oil at the top of the juice and virtually no oil in the body thereof.

One advantage of this invention is that the particles of stabilized flavoring composition are prepared without applying any crushing or grinding step. This gives the advantage that the loss of flavoring agent concomitant with grinding or crushing operations is prevented. Another point is that the prior crushing or grinding operation invariably leads to the formation of dust-like or fine particles in a greater or lesser percentage of the total material treated. Such fine material has little practical utility and is generally discarded. In the instant invention, no grinding or crushing is applied and no fines are produced.

A further advantage of this invention is that the need for vacuum treatment to remove flavoring agent on the surface of the particles is eliminated, since in the process of this invention the flavoring agent does not appear on the surface of the particles of the final produce. As a result the production of the stabilized flavoring composition according to this invention is simpler, faster, more efficient, and the loss of flavoring agent during processing is decreased.

A further advantage of the product is that the particles are especially free-flowing and can readily be poured from one container to another like so much buckshot or gravel. This property is of great advantage in dispensing measured quantities into containers of food or the like. The product has such good pouring qualities that it can even be dispensed with automatic weighing devices. A still further advantage is that the rod shape gives the particles substantial strength. Thus the particles can be poured from one container to another, subjected to vibratory and impact stresses as in shipping the product, etc., all without breakage of the particles. This is a distinct advantage because any breakage would result in exposure of flavoring agent to air whereby loss and deterioration of flavoring agent would be made possible. In contrast to the products of this invention, those made by crushing or grinding masses of solid flavoring compositions result in formation of irregular particles having narrow edges, projecting points, etc., all of which make for a product which is easily broken by subjection to the usual mechanical stresses of packaging, shipping, etc. and which therefore leads to the decrease in stability of the flavoring principles. Also, such irregular particles do not possess good flavoring or pouring qualities because the irregular particles tend to interlock with one another thus impeding flow of the particles.

A further advantage of the invention is that the method by which the particles are made is particularly adapted to yield particles wherein none of the flavoring agent is on the surface of the particles, the flavoring agent being in the body of the particles and wherein the surface of the particles is of a dense and non-porous nature. This situation is explained as follows:

Initially the flavoring agent, such as orange oil, is emulsified with the hot carrier base, for example, sugar. There is thus formed a composition in which there is a continuous phase of the sugar base with minute particles of the oil dispersed uniformly throughout the continuous phase. When this emulsion is extruded through the orifice and formed into a continuous stream, the surface of this stream will consist only of sugar base rather than a material containing both sugar base and oil. Thus by the effect of surface tension, as the stream is formed the oil is forced inwardly from the surface leaving a microscopically thin surface layer of the stream entirely free from oil. The stream is then divided by transverse cutting or pinching action into rod-shaped particles. Thus the rods so produced retain the same characteristic of having a thin surface layer of oil-free sugar base. This means that the surface of each rod is dense and non-porous so that the oil within each rod is protected to a maximum extent from penetration of air or other deleterious influences. By contrast, such a situation cannot be achieved by the prior crushing method. Thus if a solidified emulsion of the oil in a sugar base is broken up by crushing, grinding, or the like, the surface of each particle will be the same as the interior, i. e., a matrix of the base containing minute globules of the oil dispersed throughout the matrix. Such a surface is necessarily porous, particularly after the surface oil disappears vaporization leaving a multitude of minute pores or orifices in the surface of each particle.

The production of the novel compositions of this invention is illustrated below in connection with a description of the apparatus and procedural aspects of the invention:

An example of apparatus suitable for producing the products of this invention is depicted in Fig. 1 of the annexed drawing. Referring to this figure, the device includes a container 1 made of asbestos, glass fibers, or other insulating material. For maintaining the interior of container 1 at the desired temperature there is provided a series of electrical strip-heaters 2 and fan 3 driven by electrical motor 4. The fan 3 circulates air between heaters 2 (which are spaced from one another) and about the space within container 1.

The carrier base is held in hopper 5, surrounded by electrical heating mantle 6 which serves to keep the base at the desired temperature and degree of fluidity. The hot liquid base is forced by pump 7 into mixer 10 via tubes 8 and 9. Pump 7 is preferably equipped with a variable speed drive so that the rate of flow can be controlled. The volatile flavoring agent (such as orange oil) is kept in hopper 11 and is forced by pump 12 into mixer 10 via tubes 13 and 14. Pump 12 is preferably provided with a variable speed drive so that the rate of flow of the oil can be regulated.

Within mixer 10, actuated by variable speed electric motor 15, the oil and molten base are intimately commingled to form a hot liquid emulsion, the base forming the continuous phase and the oil forming the dispersed phase. Mixer 10 may be, for example, a colloid mill.

The hot emulsion of oil and carrier base is forced through tube 16 into nozzle 17. The rate of flow and the internal diameter of nozzle 17 are so correlated that the emulsion issues from the nozzle as a continuous stream 18 of narrow cross-section. Usually, the orifice diameter is chosen such that the stream has a diameter of about 0.01 to about 0.10 inch.

Beneath nozzle 17 are provided rotating drums 20 and 21 equipped with teeth 22 and 23. To simplify the drawing, only a limited number of teeth are shown, in actuality teeth are provided about the entire circumference of each drum. Drums 20 and 21 are preferably hollow and provided with means for circulating a cooling medium, such as water, through them. The drums are rotated in opposite directions as depicted by the arrows but at the same speed. The speed of the drums is so regulated that the teeth 22, 23 have approximately the same peripheral speed as the speed at which thread 18 moves downwardly. This thread 18 is descending from nozzle 17 is cooled by the atmosphere to a plastic state and engagement of the teeth 22, 23 with the thread or stream 18 divides it into rods 24. It is to be noted that teeth 22, 23 do not mesh with one another but their points come opposite and touch one another at the instant when the teeth are in the plane passing through the axes of drums 20 and 21. Preferably, drums 20 and 21 are provided with means for adjusting the distance from one another whereby the degree of contact between teeth 22 and 23 can be adjusted to get proper subdivision of the stream 18 into rod-like elements. In general, the spacing of the teeth on the periphery of the drums is so chosen that the rods have a length of about 2 to 10 times their diameter.

It is also preferred that means be provided for adjusting the distance between nozzle 17 and drums 20, 21. By control of this distance one is assured that the stream 18 is cooled to a plastic state by the time it is engaged by teeth 22, 23.

Beneath drums 21, 21 is provided means for cooling and hardening rods 24. This means includes a tunnel 25 open at both ends and through which a current of cool air is forced in the direction shown by arrow 26. The rods 24 pass through aperture 27 onto conveyor belt 28 which carries them through the tunnel while being subjected to the current of cool air. The cooled, hardened particles, now indicated by 29, are dropped off the belt and fall through aperture 30 into hopper 31. The cool air forced through tunnel 25 is preferably in a dry state to prevent the rods 24 from getting tacky or assuming a crystalline state. It is obvious that the distance between drums 20, 21 and the top flight of belt 28 should be so selected that rods 24 are in a non-sticky state by the time they fall upon the belt. An enlarged view of the final product, 29, is shown in Fig. 2.

If desired the carrier base and flavoring oil may be formed into a hot emulsion in equipment other than described above. For example, a preformed hot emulsion may be directly pumped into nozzle 17 and subsequently processed as above described. It is preferred however to form the emulsion continuously and immediately prior to extrusion through the nozzle because when such is done loss of flavoring oil through vaporization and/or deterioration is minimized. Where a preformed hot emulsion is used, the oil is subjected to heat for a longer period of time and vaporization and deterioration are more likely to occur.

The invention is further demonstrated by the following examples wherein parts are by weight:

Example I

A mixture of 100 parts sucrose, 50 parts corn syrup (approx. 55% dextrose equivalent) and 26 parts water was boiled until the solution had a boiling point of 150° C. This sugar base was cooled to 130° C. (at which temperature it was still liquid) and 10 parts of orange oil was incorporated therein with vigorous agitation. The resulting hot emulsion was pumped through an orifice having an internal diameter of 0.043 inch at the rate of 2.4 cc. per minute. The pump, connecting tubing, and orifice were in a container wherein the temperature was maintained at about 120° C.

The continuous stream issuing from the orifice was allowed to move downwardly in air a distance of about 3 inches at which point it was engaged by a cutting mechanism as described above in connection with the drawing. By this mechanism, the continuous thread of plastic material was divided into rods having a length of about 0.25 inch and a diameter of about 0.035 inch. These rods were then cooled to harden them. They had a glassy appearance and microscopic examination disclosed that they were composed of a solid amorphous sugar phase with minute globules of orange oil uniformly distributed throughout the continuous sugar phase. The particles had a dry slippery feel, not being tacky and could be poured from one container to another like buck shot or gravel.

Example II

A mixture of 90 parts dextrose and 10 parts levulose was melted by heating to about 160° C. The resulting liquid sugar base was cooled to about 108° C. and 5 parts of orange oil was incorporated therein with vigorous agitation. The hot emulsion was formed into rod-like particles as described in connection with Example I. The rods were in the amorphous state and had a non-tacky smooth surface.

Example III

A quantity of fresh orange juice was concentrated under vacuum to produce a six-fold concentrate. This concentrate was then reduced to dryness by subjecting a thin layer of the concentrate to vacuum dehydration using conditions to cause puffing of the concentrate during dehydration (as disclosed in the patent application of S. I. Strashun filed June 4, 1952, Serial No. 291,817). The dehydrated orange juice was broken up into flakes and to it was added sufficient of the product of Example I to furnish about 0.08% of orange oil in the composite product. A sample of this product was reconstituted by addition of water and found to produce a reconstituted juice having a taste almost indistinguishable from fresh orange juice. Even after storage of the composite product for several months, it was found to form a juice of natural taste and odor. Further, on reconstitution it was found that some of the orange oil dissolved in the reconstituted juice and the remainder existed as minute globules suspended in and dispersed throughout the whole body of juice giving it a natural taste and appearance.

It is to be noted that the solid, rod-like products of this invention are preferably in an amorphous state. This is an important facet of the invention and explained as follows: If the hot mass containing the flavoring agent and the molten carrier base, for example, a sugar, were to solidify by crystallization, the flavoring agent would not be stabilized nor be held securely by the crystal mass. Thus, because of the manner in which sugars crystallize, the solid would be a mass of sugar crystals with the flavoring agent existing mainly in channels or interstices in the crystalline mass. Many of these channels would provide the avenues by which the flavoring agent could vaporize from the composition and whereby air could contact the flavoring agent whereby to cause deterioration of the flavor. As a result, with a composition of crystalline nature, the flavoring agent would not be protected from vaporization nor from deterioration. When proceeding in accordance with the preferred modification of this invention, the flavoring agent is incorporated in a molten sugar base. At this point one has a liquid, emulsified mass in which the sugar base is the continuous phase and the flavoring agent is the dispersed phase, that is, the flavoring agent is uniformly dispersed throughout the body of the sugar base as minute globules. When this material is subsequently cooled, the same relationship is maintained, that is, the cooled product is a mass of now solid amorphous sugar with minute globules of the flavoring agent uniformly dispersed throughout the sugar base. This material is thus still an emulsion, though now in the solid state. It is to be noted that this solidification is caused not by crystallization but simply by such a large increase in viscosity that the material will retain its shape—such a solid is in an amorphous state. The solidification which occurs is analogous to the setting of molten glass in which case cooling of the melt results in such a great increase in viscosity that the material is termed a solid. The product of this invention in the amorphous state has very desirable properties as to stabilizing the flavoring agent against vaporization and deterioration. Because the flavoring agent exists as minute globules dispersed in the amorphous matrix of the sugar base, the flavoring agent is protected from contact with the atmosphere so that vaporization and deterioration cannot take place. In the products of this invention, there are no channels as in a crystalline product and hence no avenues are provided for escape of the flavoring agent or contact thereof with the atmosphere. An additional advantage of the globular, dispersed nature of the flavoring agent in the amorphous sugar base is that when the composition is contacted with water as in preparation for ultimate use, the flavoring agent is dispersed throughout the liquid mass as minute droplets suspended in the liquid. This means that the reconstituted juice or other liquid product has a natural appearance and a uniform flavor in all its parts.

Regarding the ingredients of the emulsion, one may employ many different voltaile flavoring agents, for example, orange oil, lemon oil, grapefruit oil, lime oil, clove oil, peppermint oil, bay oil, cedarwood oil, apple essence, pear essence, pineapple essence, grape essence, peach essence, apricot essence, strawberry essence, raspberry essence, cherry essence, prune essence, plum essence, cinnamon oil, oil of nutmeg, oil of sage, oil of bitter almonds, cassia oil, teaseed oil, coffee essence, and so forth. Mixtures of different flavoring agents may of course be employed. In the case of fruit essences, such as those enumerated above, it is preferable to first purify them to remove water and low-molecular weight alcohols by the process described in the patent application of K. P. Dimick and B. Makower, Serial No. 368,016, filed July 14, 1953. It is also preferred to add an edible oil and/or an edible emulsifying agent to the purified fruit essence so that it will emulsify properly with the molten sugar. Instead of or together with natural flavoring principles, synthetic flavoring agents may be employed. Examples are the edible flavor and aroma bearing aldehydes, alcohols, esters, ketones, phenols, and lactones, for instance, methyl anthranilate, decanal, nonanal, undecanal, cinnamic aldehyde, geraniol, menthol, methyl salicylate, phenylethyl alcohol, diacetyl, citronellol, citral, and so forth.

The proportion of flavoring agent to be incorporated in the carrier base may be varied depending on the flavor strength desired in the final product. Usually enough of the flavoring agent is added to furnish about from 5 to 25% thereof in the emulsion.

Regarding the carrier base, one may employ any edible, solid, water-soluble material which may be melted without decomposition. Some examples of such materials are sorbitol, mannitol, alpha methyl glucoside, beta methyl glucoside, or mixtures of these. Usually, however, it is preferred to use a sugar or mixture of sugars because their use enables one to readily obtain a solid product in the amorphous state and to preserve this state on storage of the products. As explained above, in the amorphous state the carrier base exhibits a maximum ability to protect the entrapped flavoring principle from vaporization and deterioration. The carrier base is thus preferably a sugar or more preferably a mixture of sugars and a minor proportion of a liquefying temperature depressant, for example water. Various sugars may be used, for example, sucrose, dextrose, maltose, levulose, lactose, mannose, galactose, etc. Preferably a mixture of sugars is used to ensure the formation of an amorphous mass when the liquid emulsion is cooled. For instance, if sucrose is selected as the basic ingredient one may incorporate with it a quantity, for example, from 10 to 50%, of a different sugar such as dextrose, corn sugar, invert sugar, corn syrup, corn syrup solids, maltose, fructose, lactose, mannose, galactose, etc. Usually for practical purposes it is prefered to add about 33% of corn syrup or corn syrup solids. The use of a mixture of sugars rather than a single sugar also has the advantage that the mixtures will liquefy at a lower temperature than will the individual sugars. A lower liquefying temperature is desirable in that the flavoring agent can be incorporated with the sugar base at a lower temperature without danger of crystallization while stirring in the flavoring agent. Further, incorporation of the flavoring agent at a lower temperature minimizes vaporization and/or deterioration of the flavoring agent and prevents caramelization of the sugar base.

As pointed out above, to lower the melting point of the sugar and to ensure formation of an amorphous solid product, it is preferred to add a different sugar to the one chosen as the major constituent. However other agents can be added to the individual sugar or mixture of sugars to lower the liquefaction temperature and/or to ensure formation and maintenance of the amorphous solid state. Such agents are, for example, sorbitol, propylene glycol, glycerol, sodium gluconate, alpha-methyl glucoside, dextrin, delta-gluconolactone, or other non-toxic aliphatic polyhydroxy compound. The proportion of the agent to be added may be from about 1% to about 20%, depending on the efficiency of the particular agent selected and the liquefying temperature desired. In the case of liquid additives such as propylene glycol, glycerol, etc., these should not be used in such high proportion as to cause the final product to be tacky. The proper amount to use in any particular case can be easily determined by conducting a few pilot trials with various proportions of the agent in question.

In many cases it is desired to add a small proportion of water, on the order of 1 to 10%, to the sugar base. The addition of water provides several advantages, as follows: The liquefying point of the sugar or sugars is decreased whereby the flavoring agent can be emulsified in the sugar base at a lower temperature whereby vaporization and/or deterioration of the flavoring agent is minimized. In addition, lowering the temperature decreases the possibility of charring or other deterioration of the sugar during the incorporation procedure. A further point is that addition of water decreases the viscosity of the mixture so that incorporation and emulsification can take place more readily and efficiently. Where water is utilized as the liquefying temperature and viscosity depressant, it is convenient to first dissolve the sugar components in the least amount of water necessary to form a solution and then boil the resulting solution until it reaches a solids content high enough so that on cooling to room temperature it will form a hard glassy mass.

In forming the emulsion of flavoring agent and sugar base, it is of course necessary to apply heat to form a liquid emulsion. The temperature to be applied will depend mainly on the character of the sugar base and usually it is preferred to use as low a temperature as will liquefy the sugar base and yield a liquid fluid enough so that the flavoring agent can be incorporated in and to yield an emulsion fluid enough to be readily pumpable through the orifice. In general temperatures on the order of 80° to 150° C. are used. In many instances it is necessary to initially apply a higher temperature to the sugar base alone to liquefy it; the liquefied base can then be cooled to the above range without solidifying and mixed with the flavoring agent. The pressure of small amounts of water (or organic liquefying temperature depressant) or the use of mixtures of sugars are useful to permit this cooling to take place without solidification of the sugar base and without undue rise in the viscosity of the liquefied sugar base. For best results, the flavoring agent is incorporated into the sugar base without at the same time beating air into the mixture.

The finished product is preferably stored in sealed containers to ensure the particles remaining in an amorphous state and to prevent them from becoming tacky. To further prevent development of crystallinity and/or tackiness, the products are packed together with a desiccant. That is, the particles are placed in a sealed container which also contains, in a vapor-permeable packet of paper or the like, a desiccant such as calcium oxide, silica gel, montmorillonite, calcium sulphate, calcium chloride, etc. The desiccant serves to remove traces of moisture from the particles and thus maintains them in an amorphous, non-tacky condition so that they are in perfect condition for use at any desired time.

Having thus described the invention, what is claimed is:

1. A process for preparing a solid flavoring composition in the form of small, rod-shaped particles without application of attrition to such solid composition which comprises forming a hot, liquid emulsion of a volatile flavoring agent in a melted sugar base, extruding the hot emulsion in the form of a continuous stream of narrow cross-section, cooling the stream to a plastic condition while supporting the stream in the atmosphere out of contact with solid surfaces, transversely subdividing the stream while in plastic condition into rod-shaped elements and cooling these elements to a solid state.

2. The process of claim 1 wherein the volatile flavoring agent is a citrus oil.

3. The process of claim 1 wherein the stream is extruded into the atmosphere.

4. The process of claim 1 wherein the stream is extruded into a cool atmosphere of low humidity.

5. The process of claim 1 wherein the sugar base is a non-crystallizing mixture of at least two different sugars and a minor proportion of water.

References Cited in the file of this patent

UNITED STATES PATENTS

| | | |
|---|---|---|
| 1,512,730 | Washington | Oct. 21, 1924 |
| 1,949,835 | James et al. | Mar. 6, 1934 |
| 2,566,410 | Griffin | Sept. 4, 1951 |